United States Patent [19]

Rein

[11] 4,134,139
[45] Jan. 9, 1979

[54] METHOD AND ARRANGEMENT FOR WRITING AND READING BIT SEQUENCES

[75] Inventor: Wolf-Heider Rein, Pforzheim, Germany

[73] Assignee: International Standard Electric Corporation, New York, N.Y.

[21] Appl. No.: 817,085

[22] Filed: Jul. 14, 1977

[30] Foreign Application Priority Data

Jul. 28, 1976 [DE] Fed. Rep. of Germany ....... 2633836

[51] Int. Cl.² ............................................. G11B 5/09
[52] U.S. Cl. .................................. 360/44; 360/40
[58] Field of Search ............... 360/40, 44; 325/142, 325/143

[56] References Cited

U.S. PATENT DOCUMENTS

| 3,281,806 | 10/1966 | Lawrence et al. | 360/44 |
| 3,377,583 | 4/1968 | Sims, Jr. | 360/44 |
| 3,750,121 | 7/1973 | Lee | 360/40 |
| 3,996,613 | 12/1976 | Manning et al. | 360/40 |
| 4,000,512 | 12/1976 | Lau | 360/44 |

Primary Examiner—Vincent P. Canney
Attorney, Agent, or Firm—John T. O'Halloran; Alfred C. Hill

[57] ABSTRACT

A digital magnetic recording method dependent only on the spacing between flux changes. The flux change spacing with the length "one" is allotted to binary bit "1", that the flux change spacing with the length "one and a half" is allotted to the binary sequence "01" and that the flux change spacing with the length "two" is allotted to the binary sequence "00".

4 Claims, 6 Drawing Figures

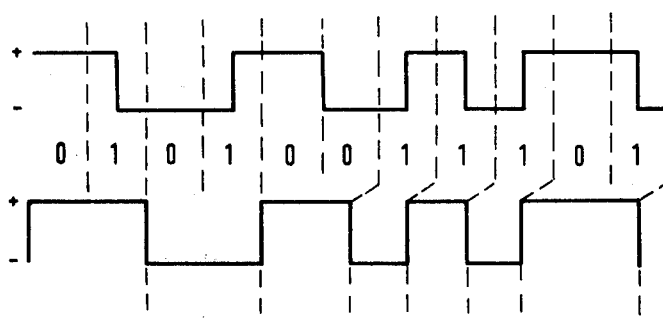
Fig.1a (PRIOR ART)
Fig.1b
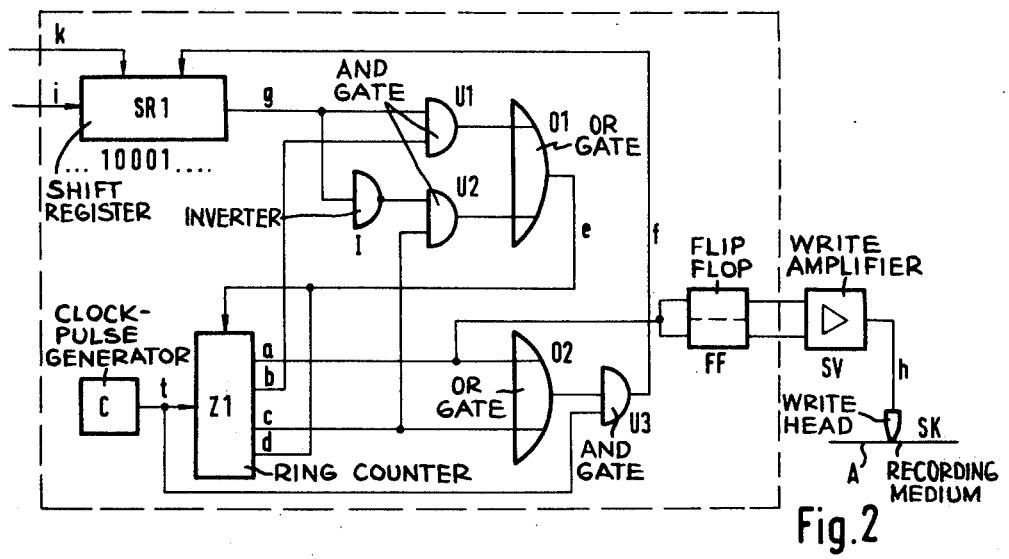
Fig.2
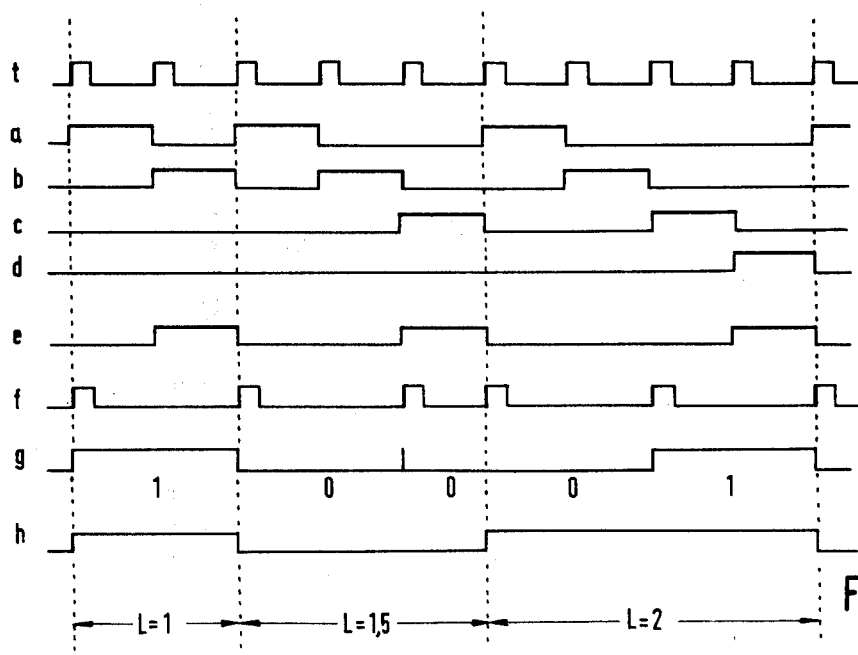
Fig.3

METHOD AND ARRANGEMENT FOR WRITING AND READING BIT SEQUENCES

BACKGROUND OF THE INVENTION

The present invention relates to a method of writing bit sequences as a self-timing signal wave on a magnetic recording medium and/or for reading the written signal wave.

The mechanical and electrical properties of a given magnetic memory require a specific minimum spacing between flux changes if information is to be recorded and reproduced with sufficient reliability. From this minimum spacing between flux changes follows the maximum density of flux changes (density of flux changes = number of changes of magnetization over a given length of track). It is a reference magnitude for the storage capacity. Another reference magnitude is the efficiency of the recording mode used. The efficiency is the ratio of the bit density (= number of bits stored along a given length of track) to the density of flux changes. It is equal to the reciprocal of the number of minimum spaces between flux changes required to store one bit.

The two-frequency recording mode according to DIN 66 010 has an efficiency of 50%, and the three-frequency recording mode according to U.S. Pat. No. 3,414,894 has an efficiency of 100%.

In the three-frequency recording mode, use is made of three different flux-change spacings two of which have different meanings. Thus, the information cannot be recovered from the spacing alone, it is also necessary to determine the instant of the flux change in relation to the clock period or, in other words, the meaning of a bit is dependent on the preceding bit in the bit sequence. This means that a bit sequence to be written must always be preceded by a particular bit or a particular bit pattern in order that the read circuit can decode the bit sequence at all, and that a dropout of a flux change results in the following information being decoded wrongly.

SUMMARY OF THE INVENTION

The object of the invention is to provide a magnetic recording method based on the above-mentioned U.S. Patent which, even after individual flux changes have dropped out, permits the following information to be decoded error-free.

A feature of the present invention is the provision of a method of writing bit sequences as a self-timing signal wave on a recording medium and for reading the written signal wave comprising the steps of coding, prior to a writing operation, given ones of the four possible combinations of two successive bits of a bit sequence and at least one type of single bits, writing like combinations and like single bits with like spacings between two flux changes on the recording medium, writing different combinations as well as at least one of the type of single bits with different spacings between two flux changes on the recording medium and reading the spacings between flux changes to recover the information written on the recording medium.

Another feature of the present invention is the provision of a coding circuit for carrying out the writing method of the recording arrangement comprising a shift register to provide the bit sequence to be written, a clock pulse generator providing clock pulses, a counter coupled to the generator to advance the count thereof responsive to the clock pulses to its final count or is reset before the final count, depending on the bit sequence appearing at the output of the shift register, and logic circuitry coupled to the generator, the shift register and the counter to produce from the clock pulses read pulses for the shift register.

Still another feature of the present invention is the provision of a decoding circuit for carrying out the reading method of the recording arrangement comprising a shift register into which decoded information is written as a bit sequence, three monostable multivibrators coupled to a recording medium, the multivibrators each having different dwell times, two of the multivibrators being triggered by an amplified read signal from the recording medium, a third of the multivibrators being triggered by one of the two of the multivibrators, and logic circuitry coupled to the shift register the three multivibrators and the recording medium to provide a write pulse for the shift register and the decoded information from the recording medium.

In the method according to the present invention, as in the three-frequency recording mode, the minimum bit density is equal to the maximum density of flux changes, i.e., the minimum efficiency is 100%, too. The maximum bit density in the novel method, however, is 1.33 times the maximum density of flux changes, so the maximum efficiency is 133%. This efficiency is achieved when writing a "... 0000 ..." binary sequence. When writing stochastic bit sequences, a mean efficiency of approximately 108% is obtained.

Instead of increasing efficiency, the minimum spacing between flux changes may be enlarged. This means that the requirements placed on the mechanical and electrical accuracy of the write/read device and of the recording medium as well as the speed tolerance of the recording medium can be reduced.

BRIEF DESCRIPTION OF THE DRAWING

Above-mentioned and other features and objects of this invention will become more apparent by reference to the following description taken in conjunction with the accompanying drawing, in which:

FIG. 1a shows the three-frequency recording mode described in U.S. Pat. No. 3,414,894;

FIG. 1b shows the recording mode according to the invention;

FIG. 2 is a block diagram of the write circuit in accordance with the principles of the present invention;

FIG. 3 illustrates a timing diagram for the circuit of FIG. 2;

DESCRIPTION OF THE PREFERRED EMBODIMENT

Figure 4:
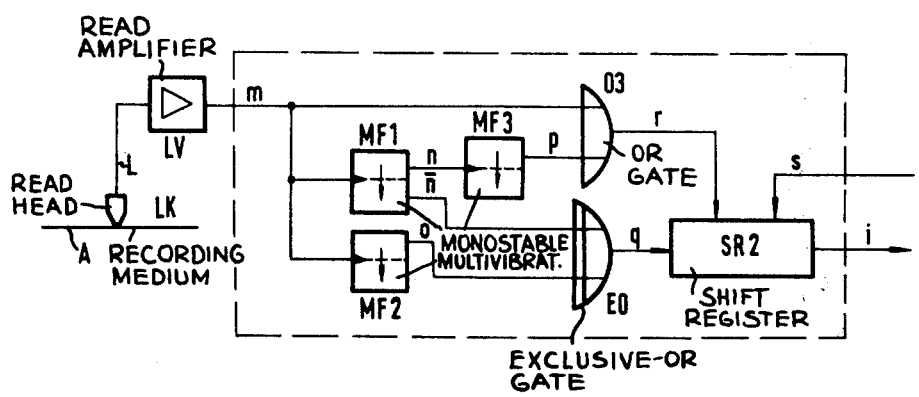
FIG. 4 is a block diagram of the read circuit in accordance with the principles of the present invention.

To permit a comparison between the prior art and the present invention, the three-frequency recording mode (MFM) is shown in FIG. 1a, and the recording mode according to the present invention is shown in FIG. 1b, as the write head writes the information on the tape.

The coding rules of the MFM are as follows:

(a) A "zero" is represented by a flux change at the beginning of a bit interval.

(b) A "one" is represented by a flux change in the middle of a bit interval.

(c) There must be no flux change after a half bit interval.

In the MFM, there are three differently long spacings between flux changes, which, however, are not allotted an unambiguous meaning. A flux change spacing of one bit interval means either a zero or a one, depending on the previous bit. During decoding, the information cannot, therefore, be recovered from the spacings between flux changes alone.

By contrast, in the recording mode according to the present invention, shown in FIG. 1b, each spacing between flux changes has a single meaning permanently alotted thereto, i.e., (a) a flux change spacing of one bit interval is allotted the meaning binary "one;"

(b) a flux change spacing of one and a half bit intervals is allotted the meaning "zero-zero" ("00"); and (c) a flux change spacing of two bit intervals is allotted the meaning "zero-one" ("01").

In the present invention, no flux change spacing is provided for a single binary "zero" (0) since the bit sequences are always written into the recording medium in blocks, and since the end-of-block mark can be chosen so as to end with a binary "one" or with binary sequence "zero-zero." With this method of coding, the instant of the occurrence of the first flux change is of no consequence for the decoding process. The recording mode according to the present invention may be called a pure three-space recording mode.

The read circuit, which may also be referred to as the "coding circuit", will now be described with the aid of FIGS. 2 and 3. FIG. 2 includes a shift register SR1 which is assumed to contain the binary bit sequence 10001. The bit sequence i and the write pulses k are applied to the shift register SR1 over lines designated by corresponding reference characters.

FIG. 2 also contains a clock-pulse generator C which provides pulses t of a frequency corresponding to the flux change spacing L = 0.5, a ring counter Z1, three AND gates U1 to U3, two OR gates 01 and 02, an inverter I, and a flip-flop FF. The binary "0" and binary "1" outputs of the flip-flop FF form the output of the decoding circuit. The latter is followed by a write amplifier SV and a write head SK which acts on a recording medium A.

The ring counter Z1 is controlled with clock pulses t from the clock-pulse generator C and provides at its four outputs a to d successive pulses unless reset to its reset input by a pulse e.

Following is an explanation of the three possible signal sequences during recording, with the sequences of operation in the AND and OR gates being omitted for simplicity;

Writing of a single "1"
Writing of a "0" followed by a second "0"
Writing of a "0" followed by a "1".

In the first case (g=1), the counter Z1 is reset (e=1) after 2 clock pulses (b=1), and at the next clock pulse the flip-flop FF changes state. This is achieved by means of the logic operations $e = b \cdot g$ and $f = a \cdot t$. At the same time, the shift register SR1 receives a pulse $f = $ "1" at the shift input, whereby the next data bit is made available at the output.

In the second case (gn="0", gn+1="0"), the counter Z1 is not reset after b="1", but counts on (c="1"). The shift register SR1 simultaneously receives an additional pulse f=1 at the shift input, whereby the next data bit is made available at the output g. Since this bit has the value gn+1="0", the counter is reset (e="1") with the next clock pulse t, and the state of the flip-flop FF is changed with a="1". This is achieved by means of the logic operations $f = c \cdot t$ and $e = c \cdot \bar{g}$.

In the third case (gn="0", gn+1="1"), the initial operations are the same as in the second case. After the pulse has been applied to the shift input f, however, the data bit gn+1=1 is made available. This time, the counter Z1 is reset not by C="1", but only after d="1". Accordingly, the write circuit performs the following logic operations:

$$e = b \cdot g + c \cdot \bar{g}$$

$$f = (a + c) \cdot t$$

$$a = \text{``1''}$$

At the bottom of FIG. 3, the three flux-change spacings L=1 for "one," L=1.5 for "zero-zero," and L=2 for "zero-one" are shown.

Figure 5:
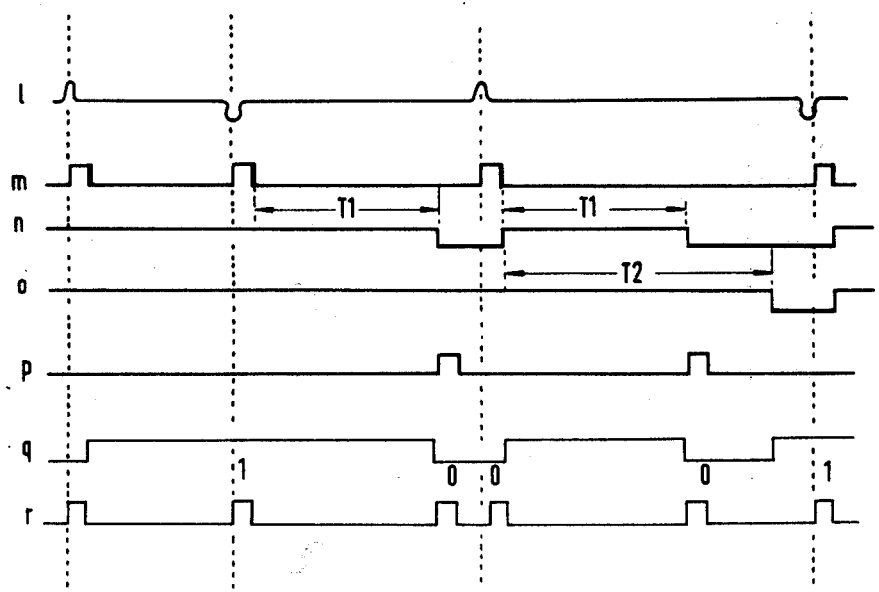
FIG. 5 is a timing diagram of the circuit of FIG. 4.

The read circuit, which may also be referred to as the decoding circuit, will now be described with the aid of FIGS. 4 and 5. FIG. 4 includes a shift register SR2 which can be assumed to have been erased prior to the read cycle. The bit sequence q decoded by the read circuit and the write pulses r are applied to the shift register SR2 over lines designated by corresponding reference characters. The stored sequence of bits can be taken from the output i of the shift register under the control of the read pulses s.

The read circuit shown in FIG. 4 also comprises a read head LK acted upon by the recording medium A, and a read amplifier LV which amplifies the read signal L and converts it to square-wave pulses m, with each change of magnetization on the recording medium generating a pulse m on the similarly designated line. The read circuit also contains monostable multivibrators MF1, MF2, MF3 as well as an OR gate 03 and an EXCLUSIVE-OR gate EO. The two monostable multivibrators MF1 and MF2 are triggered by the negative edge of the pulse m and return to their "off" states after the times T1 and T2. The monostable multivibrator MF3 is triggered by the negative edge of the output signal n of MF1 and provides a pulse at its output p.

Next, the three possible signal sequences during the read cycle will be explained, with the sequences of operations in the OR gates being omitted for simplicity:

Reading of a single "1"
Reading of a "0" followed by a second "0"
Reading of a "0" followed by a "1".

At the beginning in all three cases, the two monostable multivibrators MF1 and MF2 are triggered by each pulse m. Their dwell times T1 and T2 are so adjusted as to permit a distinction to be made between the pulse spacings and one, one and a half times, and two and a half times the "1" single bit spacing. For example, T1 corresponds to 1.25 times, and T2 to 1.75 times, the bit spacing. When a single "1" is read, the next pulse m appears before MF1 and MF2 have returned to their "off" states. In the "on" state, the output signals are n="1" and 0="1"; accordingly, the output signal of the EXCLUSIVE-OR gate $q = v \oplus 0$ is q="1". The pulse m is applied through the OR gate 03 to the shift register SR2 as the write pulse r with which the decoded value q="1" is written into the shift register SR2.

When a "0" followed by a second "0" is read, the next pulse m appears after MF1 has returned to its "off" state (n="0") while MF2 is still energized (0="1"), so the output signal q of the EXCLUSIVE-OR gate $q=\bar{n} \otimes 0$ assumes the value q="0". Before, the negative edge of n occurring at the end of T1 triggers a pulse p which is applied through the OR gate 03 to the shift register SR2 as the write pulse r with which the decoded value q="0" (the first "0") is written into the shift register. The decoded value q="0" (the second "0") is then written into the shift register SR2 by the pulse m.

When a "0" followed by a "1" is read, the next pulse m appears after both MF1 and MF2 have been returned to their "off" states (n="0" and 0+"0"). Before, the negative edge of n occurring at the end of T1 triggers a pulse p with which, as in the previous case, the value q="0" is written into the shift register. At the end of T2, $q=\bar{n} \otimes 0$ assumes the value q="1". This value is written into the shift register SR2 by the shift pulse r=m.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of writing bit sequences as a self-timing signal wave on a recording medium and for reading said written signal wave comprising the steps of:
   coding, prior to a writing operation, given ones of the four possible combinations of two successive bits of a bit sequence and at least one type of single bits;
   writing like combinations and like single bits with like spacings between two flux changes on said recording medium;
   writing different combinations as well as at least one of said type of single bits with different spacings between two flux changes on said recording medium; and
   reading the spacings between flux changes to recover the information written on said recording medium.

2. A method according to claim 1, wherein
   a "01" combination and a "00" combination are used and said one type of single bit is "1", and
   the spacing between the flux changes in the "00" combination is one and a half times the spacing between the flux changes of said "1" single bit, and
   the spacing between the flux changes in the "01" combination is two times the spacing between the flux changes of said "1" single bit.

3. A coding circuit for carrying out the ring method of the recording arrangement comprising:
   a shift register to provide the bit sequence to be written;
   a clock pulse generator providing clock pulses;
   a counter coupled to said generator to advance the count thereof responsive to said clock pulses to its final count or is reset before the final count, depending on the bit sequence appearing at the output of said shift register; and
   logic circuitry coupled to said generator, said shift register and said counter to produce from said clock pulses read pulses for said shift register.

4. A decoding circuit for carrying out the reading method of the recording arrangement comprising:
   a shift register into which decoded information is written as a bit sequence;
   three monostable multivibrators coupled to a recording medium, said multivibrators each having different dwell times;
   two of said multivibrators being triggered by an amplified read signal from said recording medium;
   a third of said multivibrators being triggered by one of said two of said multivibrators; and
   logic circuitry coupled to said shift register, said three multivibrators and said recording medium to provide a write pulse for said shift register and said decoded information from said recording medium.

* * * * *